(12) United States Patent
Nishio et al.

(10) Patent No.: US 11,984,833 B2
(45) Date of Patent: May 14, 2024

(54) ELECTRIC VEHICLE CONTROL DEVICE

(71) Applicant: Mitsubishi Electric Corporation, Tokyo (JP)

(72) Inventors: Naoki Nishio, Tokyo (JP); Yasuhiro Shiraki, Tokyo (JP); Takayoshi Miki, Tokyo (JP); Shinsuke Kadoi, Tokyo (JP); Hisanori Yamasaki, Tokyo (JP); Sho Kato, Tokyo (JP); Tetsuo Sugahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 315 days.

(21) Appl. No.: 17/628,757

(22) PCT Filed: Aug. 1, 2019

(86) PCT No.: PCT/JP2019/030320
§ 371 (c)(1),
(2) Date: Jan. 20, 2022

(87) PCT Pub. No.: WO2021/019779
PCT Pub. Date: Feb. 4, 2021

(65) Prior Publication Data
US 2022/0286066 A1     Sep. 8, 2022

(51) Int. Cl.
*H02P 27/06*     (2006.01)
*B60L 5/36*     (2006.01)
*H02P 5/74*     (2006.01)

(52) U.S. Cl.
CPC ............. *H02P 5/74* (2013.01); *B60L 5/36* (2013.01); *B60L 2200/26* (2013.01); *H02P 2207/01* (2013.01)

(58) Field of Classification Search
CPC ........ H02P 5/74; H02P 2207/01; H02P 29/50; B60L 2200/26; H02M 1/008; H02M 1/123; H02M 1/44; H02M 7/003; H02M 7/5395

See application file for complete search history.

(56) References Cited

U.S. PATENT DOCUMENTS

2017/0253344 A1*   9/2017   Wangemann ........... B60L 50/15

FOREIGN PATENT DOCUMENTS

EP        0018829 A1     11/1980
JP        S6356102 A     3/1988
(Continued)

OTHER PUBLICATIONS

International Search Report (PCT/ISA/210) with translation and Written Opinion (PCT/ISA/237), dated Oct. 29, 2019 by the Japan Patent Office as the International Searching Authority for International Application No. PCT/JP2019/030320.

(Continued)

*Primary Examiner* — Muhammad S Islam
(74) *Attorney, Agent, or Firm* — BUCHANAN INGERSOLL & ROONEY PC

(57) ABSTRACT

An electric vehicle control device includes a first inverter controlling a first group defined by induction motors, and a second inverter controlling a second group defined by induction motors. The first inverter and the induction motors of the first group are connected to each other by a first conductor. The second inverter and the induction motors of the second group are connected by a second conductor. A first length is equal to or less than three times the average value of a second length and a third length. The first length is an inter-center distance between the first conductor and the second conductor, the second length is the maximum length of a conductor portion of the first conductor in the (Continued)

cross section of the first conductor, and the third length is the maximum length of a conductor portion of the second conductor in the cross section of the second conductor.

10 Claims, 14 Drawing Sheets

(56) References Cited

FOREIGN PATENT DOCUMENTS

| | | |
|---|---|---|
| JP | H01291604 A | 11/1989 |
| JP | 2004187368 A | 7/2004 |
| JP | 2018068009 A | 4/2018 |

OTHER PUBLICATIONS

Office Action dated Jul. 1, 2022, issued in corresponding Indian Patent Application No. 202227004077, 5 pages.
Indian Hearing Notice dated Dec. 29, 2023, issued in the corresponding Indian Patent Application No. 202227004077, 2 pages.

* cited by examiner $d_2 \leq d_1$

ELECTRIC VEHICLE CONTROL DEVICE

FIELD

The present invention relates to an electric vehicle control device that controls multiple induction motors with a single inverter.

BACKGROUND

Wayside devices serving as a receiver of various types of signals are provided along a track on which electric vehicles run. To prevent malfunction of these wayside devices, electric vehicles are subject to regulations regarding leakage noise. Patent Literature 1 given below describes that a hollow core made of ferromagnetic material such as ferrite or amorphous metal is provided around the wiring between an inverter and an electric motor (hereinafter, simply motor), which is a load, to reduce common mode noise.

CITATION LIST

Patent Literature

Patent Literature 1: Japanese Patent Application Laid-open No. 2004-187368

SUMMARY

Technical Problem

Unfortunately, an electric vehicle has limited underfloor space. In some case, there is not a sufficient space for additional installation of filter elements such as the cores described in Patent Literature 1. In such a case, the specifications of the electric vehicle control device may be reconsidered in order to provide a space for additional installation of filter elements.

The filtering characteristic of a filter element needs to be determined in accordance with the impedance including that of the induction motor. The manufacturer of the induction motor is not necessarily the same as the manufacturer of the electric vehicle control device. In this case, relying on additional installation of filter elements will increase designing manpower for the manufacturer of the electric vehicle control device, and increase adjustment work on practical vehicles. It is thus desired to reduce or eliminate leakage noise without relying on additional installation of filter elements.

The present invention has been made in view of the foregoing, and it is an object of the present invention to provide an electric vehicle control device capable of reducing or eliminating leakage noise without relying on additional installation of filter elements.

Solution to Problem

To solve the problem and achieve the object described above, the present invention is an electric vehicle control device to control a plurality of induction motors with a single inverter. The electric vehicle control device comprising: a first inverter to control a first electric motor group defined by a plurality of induction motors; and a second inverter to control a second electric motor group defined by a plurality of induction motors. The induction motors belonging to the first electric motor group are mounted on different bogies, and the induction motors belonging to the second electric motor group are mounted on different bogies. The first inverter and the induction motors belonging to the first electric motor group are connected to each other by a first conductor, and the second inverter and the induction motors belonging to the second electric motor group are connected to each other by a second conductor. Between each of the first and second inverters and the bogies, a first length is equal to or less than three times an average value of a second length and a third length, the first length being an inter-center distance between the first conductor and the second conductor, the second length being a maximum length of a conductor portion of the first conductor in a cross section of the first conductor, the third length being a maximum length of a conductor portion of the second conductor in a cross section of the second conductor.

Advantageous Effects of Invention

The electric vehicle control device according to the present invention provides an advantage that the leakage noise can be reduced or eliminated without relying on the additional installation of the filter elements.

DESCRIPTION OF EMBODIMENTS

An electric vehicle control device according to embodiments of the present invention will be described in detail below with reference to the accompanying drawings. Note that the following embodiments are not intended to limit the scope of the present invention. Note also that the accompanying drawings are not necessarily drawn to scale, and neither are diagrams in different figures.

First Embodiment

Figure 1:
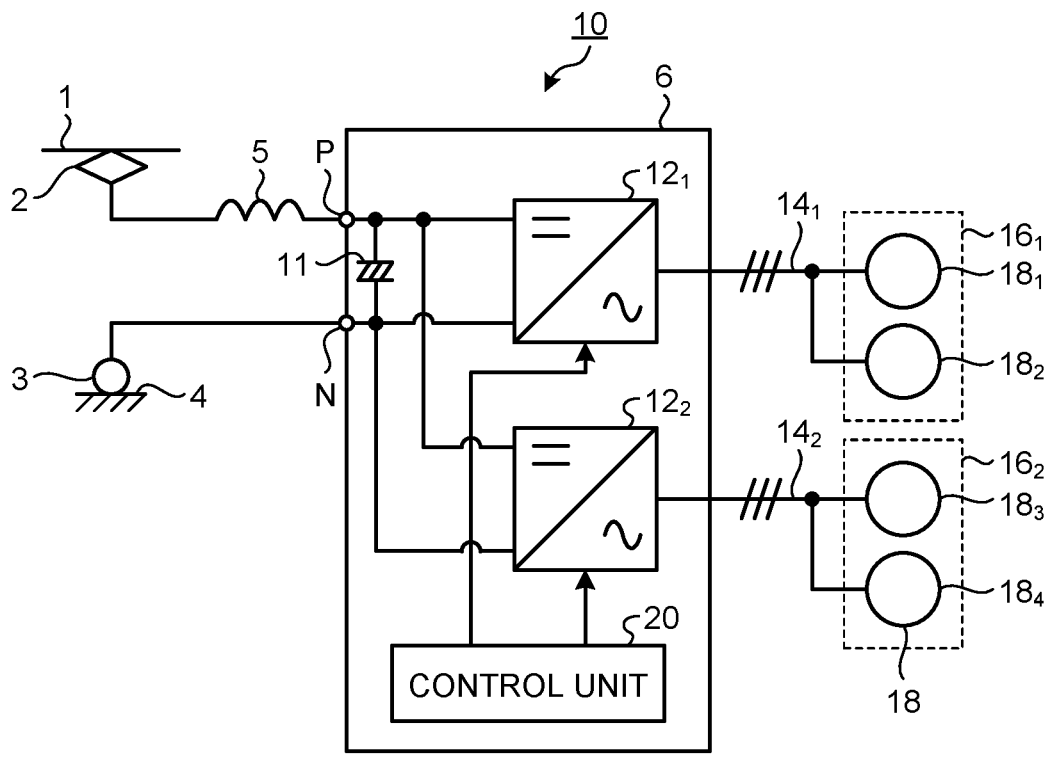
FIG. 1 is a diagram illustrating a circuit configuration of an electric vehicle control device according to a first embodiment.

FIG. 1 is a diagram illustrating a circuit configuration of an electric vehicle control device according to a first embodiment. An electric vehicle control device 10 according to the first embodiment includes, as illustrated in FIG. 1, a capacitor 11, a first inverter $12_1$, a second inverter $12_2$, and a control unit 20. The first inverter $12_1$ is connected, by a first conductor $14_1$, to two induction motors $18_1$ and $18_2$ belonging to a first motor group $16_1$. The second inverter $12_2$ is connected, by a second conductor $14_2$, to two induction motors $18_3$ and $18_4$ belonging to a second motor group $16_2$. The four induction motors $18_1$, $18_2$, $18_3$, and $18_4$ are each a main motor for driving the electric vehicle.

The first conductor $14_1$ is electrical wiring for electrically interconnecting the first inverter $12_1$ and the two induction motors $18_1$ and $18_2$. The second conductor $14_2$ is electrical wiring for electrically interconnecting the second inverter $12_2$ and the two induction motors $18_3$ and $18_4$. The first conductor $14_1$ and the second conductor $14_2$ may be made of any electrically conductive material that can provide electrical connection.

The first inverter $12_1$ and the second inverter $12_2$ are housed in the same enclosure 6. The enclosure 6 includes a positive terminal P and a negative terminal N.

Note that the following description may refer to the first inverter $12_1$ and the second inverter $12_2$ as "inverter 12" or "inverters 12" when no distinction is made therebetween, and the induction motors $18_1$, $18_2$, $18_3$, and $18_4$ as "induction motor 18" or "induction motors 18" when no distinction is made therebetween.

An overhead line 1 supplies direct current (DC) power though a current collector unit 2 and a reactor 5 to the electric vehicle control device 10. There is an electric power substation (not illustrated) beyond the overhead line 1, and the overhead line 1 serves as an external power supply for the electric vehicle control device 10. Note that the voltage of the overhead line 1, i.e., the trolley voltage, applied to the current collector unit 2, and conversion capacities in the electric vehicle control device 10 depend on the drive method. The trolley voltage ranges approximately from 600 to 3000 [V], and the conversion capacities each range from several tens to several hundred kilovolt-amperes [kVA].

The positive terminal P of the electric vehicle control device 10 is connected to the reactor 5. The negative terminal N of the electric vehicle control device 10 is electrically connected to a rail 4 via a wheel 3. This configuration allows a DC current of the DC power supplied from the overhead line 1 to flow through the reactor 5, the electric vehicle control device 10, the wheel 3, and the rail 4, and then return to the electric power substation.

Note that although FIG. 1 illustrates the overhead line 1 as an aerial electrical line, and the current collector unit 2 as a current collector unit having a pantograph shape, these elements are not limited thereto. The overhead line 1 may be a third rail used in a subway or the like, and the current collector unit 2 may be a current collector unit suitable for such a third rail. In addition, although FIG. 1 illustrates the overhead line 1 as a DC overhead line, the overhead line 1 may be an alternating current (AC) overhead line. Note that in a case in which the overhead line 1 is an AC overhead line, a transformer is provided in place of the reactor 5 to step down the AC voltage received, and a converter is provided downstream of the transformer to convert the AC voltage output from the transformer into a DC voltage.

The capacitor 11 is connected between the positive terminal P and the negative terminal N inside the electric vehicle control device 10. The capacitor 11 is connected in parallel to both ends of the first inverter $12_1$ on the input side of the first inverter $12_1$ and to both ends of the second inverter $12_2$ on the input side of the second inverter $12_2$.

The capacitor 11 smooths the DC voltage applied. In addition, the capacitor 11 is connected to the reactor 5, and forms an LC filter circuit with the reactor 5. This LC filter circuit provides protection against a surge voltage applied from the overhead line 1. The LC filter circuit also reduces the amplitude of the ripple component of the current flowing to the inverters 12. The inverters 12 are each a power conversion circuit that supplies electrical power to the corresponding induction motors 18. The inverters 12 each operate to convert the DC voltage across the capacitor 11 into an AC voltage having some voltage value and having some frequency to apply the AC voltage to corresponding ones of the induction motors 18 under control of the control unit 20.

Figure 2:
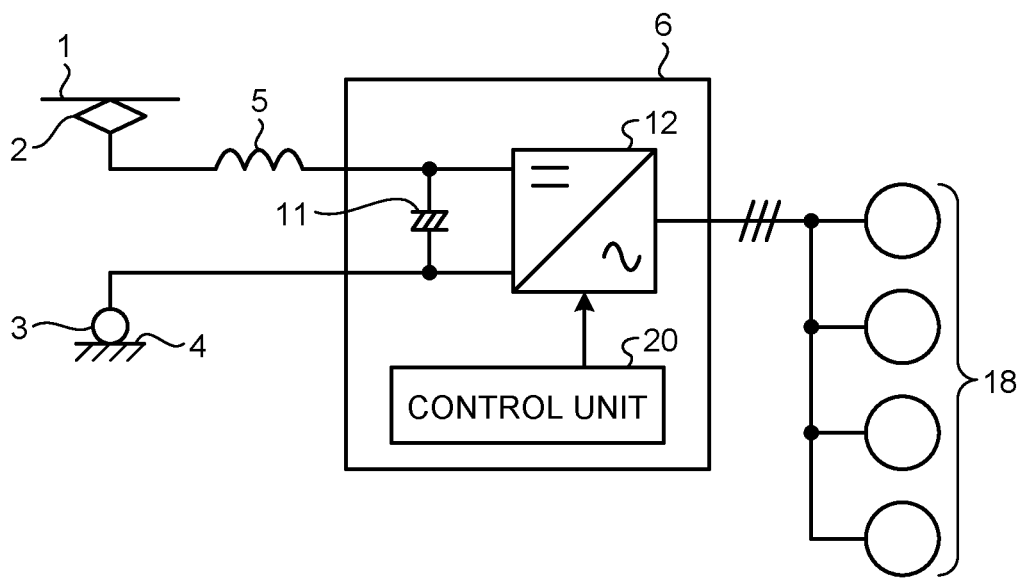
FIG. 2 is a diagram illustrating a circuit configuration of a typical conventional electric vehicle control device.

FIG. 2 is a diagram illustrating a circuit configuration of a typical conventional electric vehicle control device. In FIG. 2, like reference characters designate elements corresponding to elements illustrated in FIG. 1.

An electric vehicle control device according to conventional technology is typically configured such that, as illustrated in FIG. 2, a single inverter 12 controls all of four induction motors 18. In a case in which the main motors are induction motors, a slip, i.e., a difference between the rotational frequency and the drive voltage frequency, results in generation of torque. The slip unique to an induction motor can be used to enable a single inverter to control multiple main motors in parallel.

Figure 3:
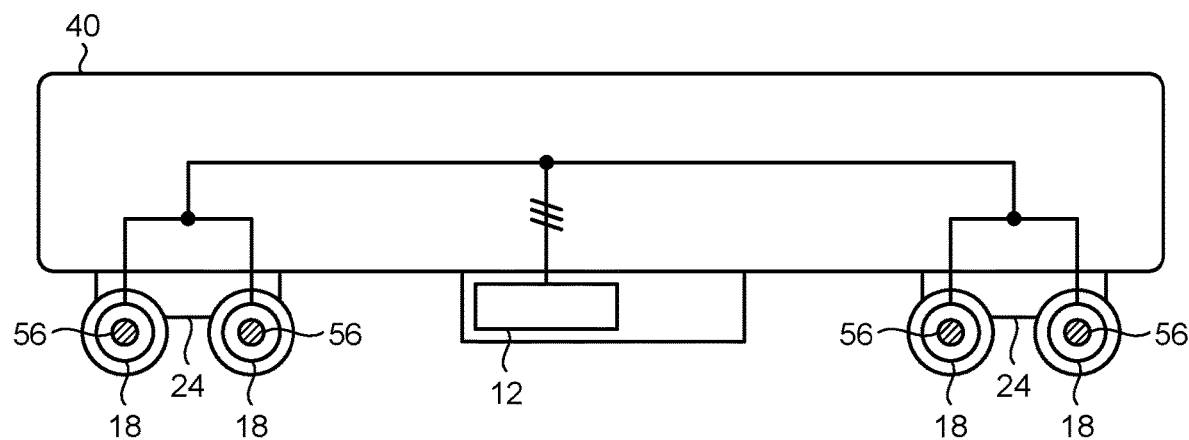
FIG. 3 is a diagram illustrating a typical conventional example arrangement of induction motors in an electric vehicle.

FIG. 3 is a diagram illustrating a typical conventional example arrangement of induction motors in an electric vehicle. In FIG. 3, like reference characters designate elements corresponding to elements illustrated in FIG. 2.

As illustrated in FIG. 3, the four induction motors 18 are mounted in two bogies 24 each of which includes two of the four induction motors 18. The configuration is such that each of the bogies 24 is supported by two axles 56, and a vehicle 40 is supported by the two bogies 24. The torque generated on the four induction motors 18 is transferred to the axles 56 via a decelerator (not illustrated), and acts to propel the vehicle 40.

Figure 4:
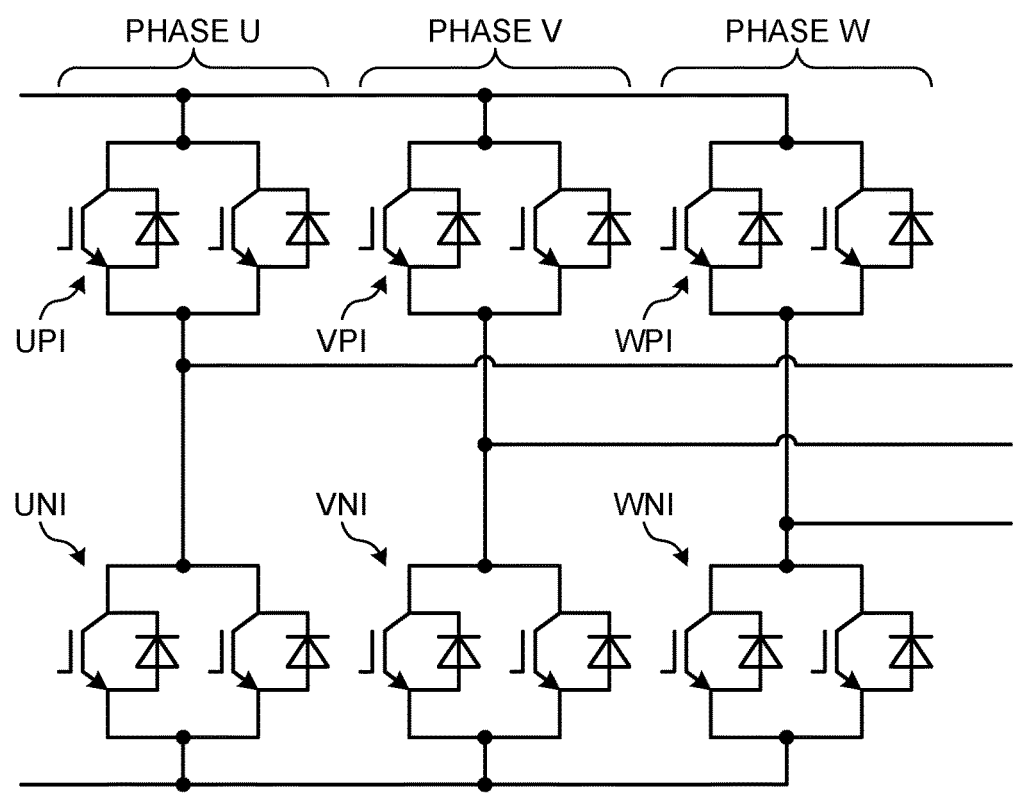
FIG. 4 is a diagram illustrating an example configuration of a typical conventional inverter main circuit.

FIG. 4 is a diagram illustrating an example configuration of a typical conventional inverter main circuit. The inverter main circuit includes semiconductor devices UPI, VPI, and WPI of upper arms and semiconductor devices UNI, VNI, and WNI of lower arms. Note that as a single semiconductor device could provide insufficient current capacity, each arm in FIG. 4 includes two semiconductor devices connected in parallel with each other. The semiconductor devices connected in parallel with each other are given the same control signal.

The pair of semiconductor devices UPI and the pair of semiconductor devices UNI are connected in series with each other to form a phase-U leg. The pair of semiconductor devices VPI and the pair of semiconductor devices VNI are connected in series with each other to form a phase-V leg. The pair of semiconductor devices WPI and the pair of semiconductor devices WNI are connected in series with each other to form a phase-W leg. The phase-U, phase-V, and phase-W legs are connected in parallel with one another to form a three-phase bridge circuit. The semiconductor devices connected in parallel with each other in each arm are given the same control signal.

Figure 5:
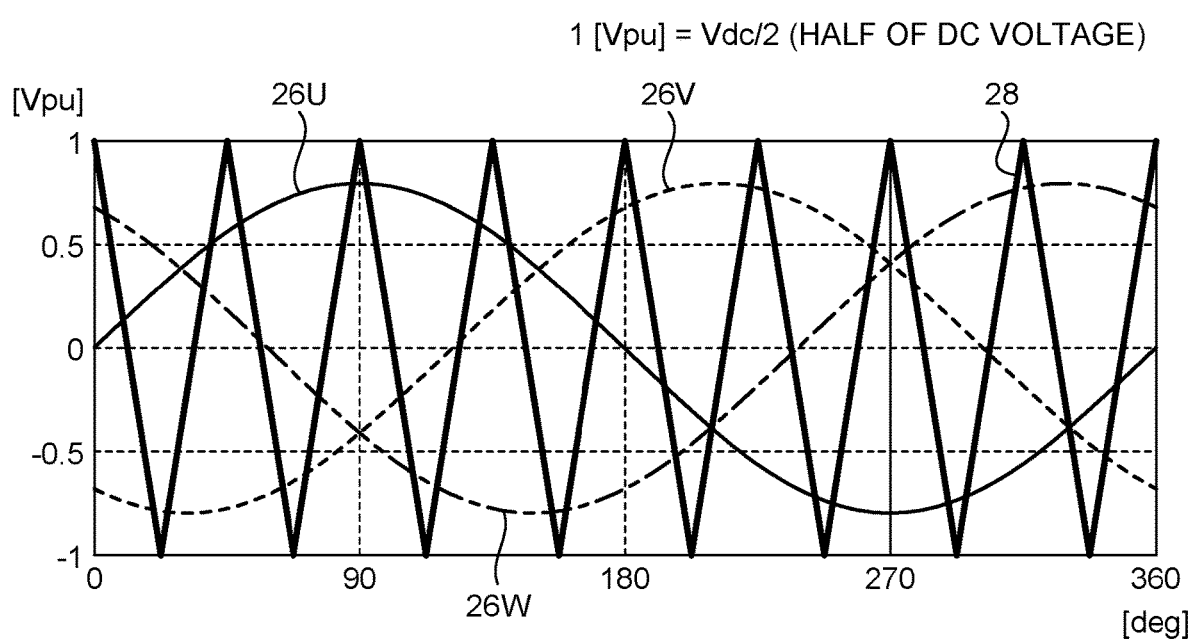
FIG. 5 is a diagram for use in describing a technique for generating a pulse width modulation (PWM) control signal to be provided to the semiconductor devices of each arm illustrated in FIG. 4.

FIG. 5 is a diagram for use in describing a technique for generating a PWM control signal to be provided to the semiconductor devices of each arm illustrated in FIG. 4. FIG. 5 illustrates a phase-U voltage command 26U, a phase-V voltage command 26V, and a phase-W voltage command 26W, each of which is a sine wave; and a carrier 28 that is a triangular wave. The horizontal axis represents the phase angle, and the vertical axis represents the amplitude value. A value of 1 [Vpu] along the vertical axis is equivalent to a half (½) of the amplitude of the voltage applied to the inverters 12. That is, the value of 1 [Vpu] is equivalent to ½ of the DC voltage that is the voltage across the capacitor 11.

Figure 6:
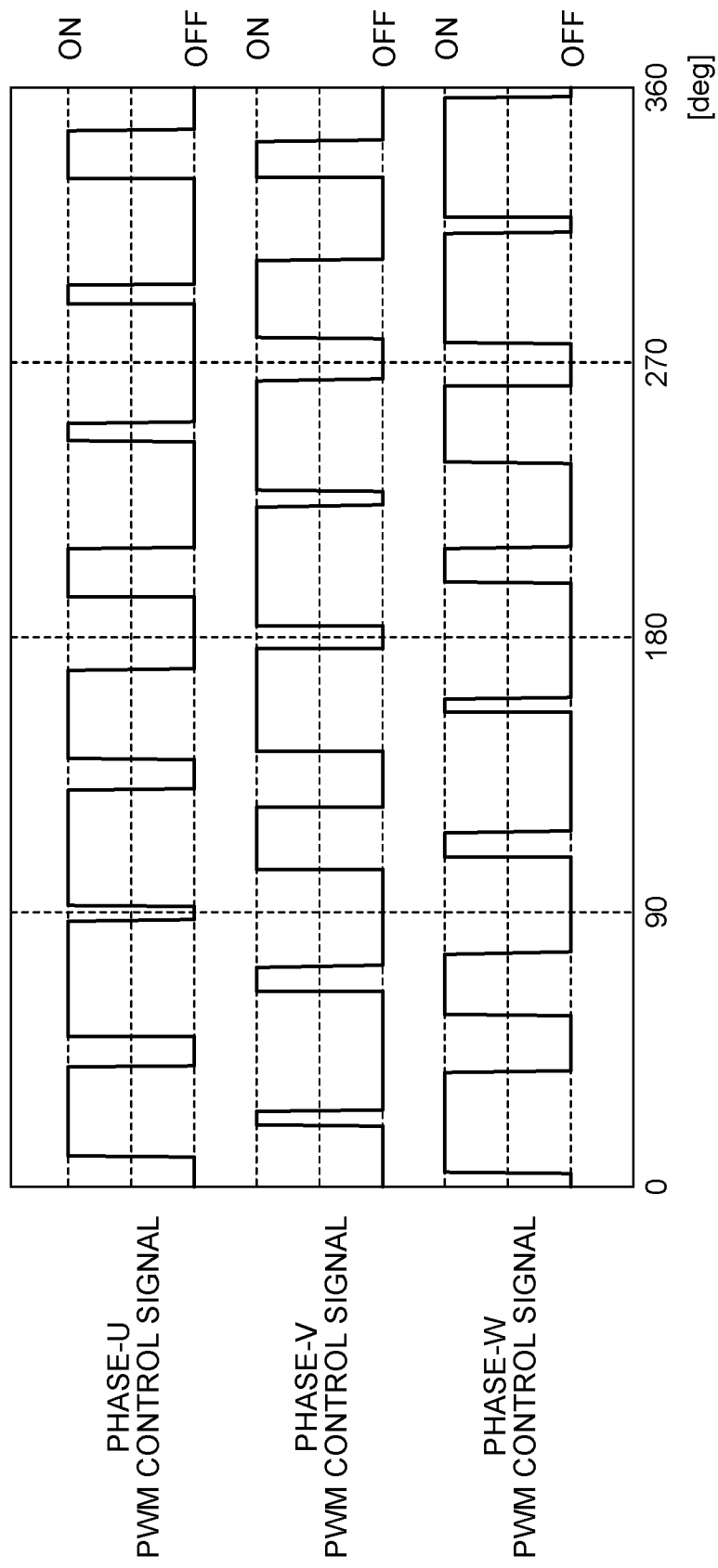
FIG. 6 is a diagram illustrating PWM control signals generated by the individual phase voltage commands illustrated in FIG. 5.

FIG. 6 is a diagram illustrating PWM control signals generated by the individual phase voltage commands illustrated in FIG. 5. FIG. 6 illustrates a phase-U PWM control signal, a phase-V PWM control signal, and a phase-W PWM control signal in that order from the top. The horizontal axis of FIG. 6 represents the phase angle, as in FIG. 5.

The control unit 20 compares the phase-U voltage command 26U and the triangular wave signal, i.e., the carrier 28. The phase-U PWM control signal becomes "ON" with the phase-U voltage command 26U greater than the carrier 28, and becomes "OFF" with the phase-U voltage command 26U less than or equal to carrier 28. The thus generated phase-U PWM control signal is illustrated in the top portion of FIG. 6. The phase-V PWM control signal and the phase-W PWM control signal are also generated by comparison of each of the phase-V voltage command 26V and the phase-W voltage command 26W with the carrier 28, as in the phase-U PWM control signal. The phase-V PWM control signal and the phase-W PWM control signal generated in this manner are illustrated in the middle and bottom portions of FIG. 6, respectively.

Figure 7:
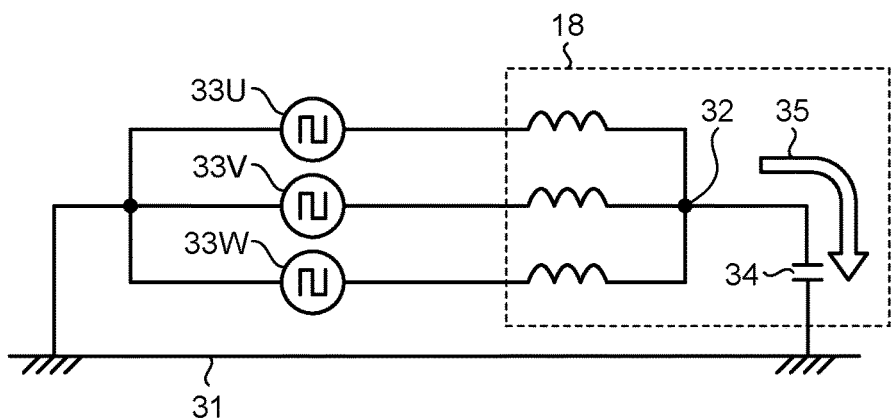
FIG. 7 is a diagram illustrating an equivalent circuit of FIG. 2, for use in describing a leakage current.

FIG. 7 is a diagram illustrating an equivalent circuit of FIG. 2, for use in describing a leakage current. FIG. 7 illustrates the induction motor 18, using a set of circuit symbols of inductor. Three-phase motors, which are not to limited to induction motors, have neutral point potentials varying when driven with three-phase inverters. This results in an equivalent circuit, as illustrated in FIG. 7, in which a stray capacitor 34 is connected between a neutral point potential 32 of the induction motor 18 and a reference potential 31 that is the ground potential. The neutral point potential 32 contains a high-frequency component caused by PWM control. As a result of application of a phase-U voltage 33U, a phase-V voltage 33V, and a phase-W voltage 33W to the induction motor 18, therefore, a leakage current 35 flows through the stray capacitor 34.

Note that the potential difference between the neutral point potential 32 and the reference potential 31 is called "common mode voltage". In the case of a three-phase inverter, the common mode voltage is calculated by (Vu+Vv+Vw)/3, where Vu is the amplitude of the phase-U voltage 33U, Vv is the amplitude of the phase-V voltage 33V, and Vw is the amplitude of the phase-W voltage 33W.

Figure 8:
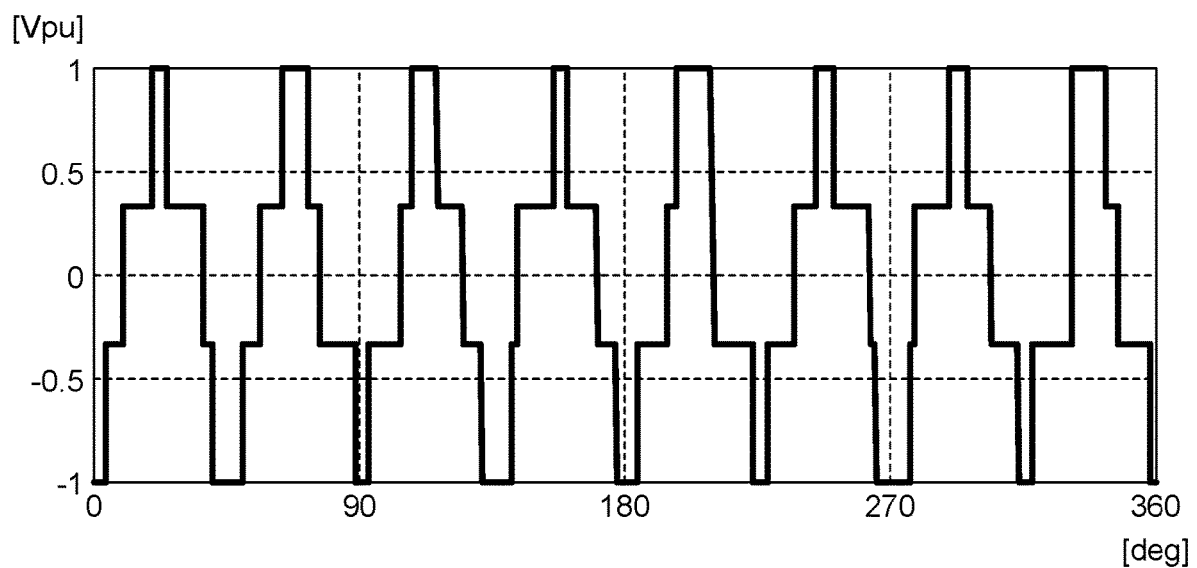
FIG. 8 is a diagram illustrating a common mode voltage caused by the PWM control signals illustrated in FIG. 6.

FIG. 8 is a diagram illustrating a common mode voltage caused by the PWM control signals illustrated in FIG. 6. In FIG. 8, the horizontal axis represents the phase angle, and the vertical axis represents the amplitude of the common mode voltage.

A leakage current flows each time the common mode voltage changes. In addition, as illustrated in FIG. 8, the common mode voltage varies in a period shorter than the period of the carrier. This shows that a reduction in the leakage current 35 flowing through the stray capacitor 34 is important for reduction or elimination of leakage noise.

Figure 9:
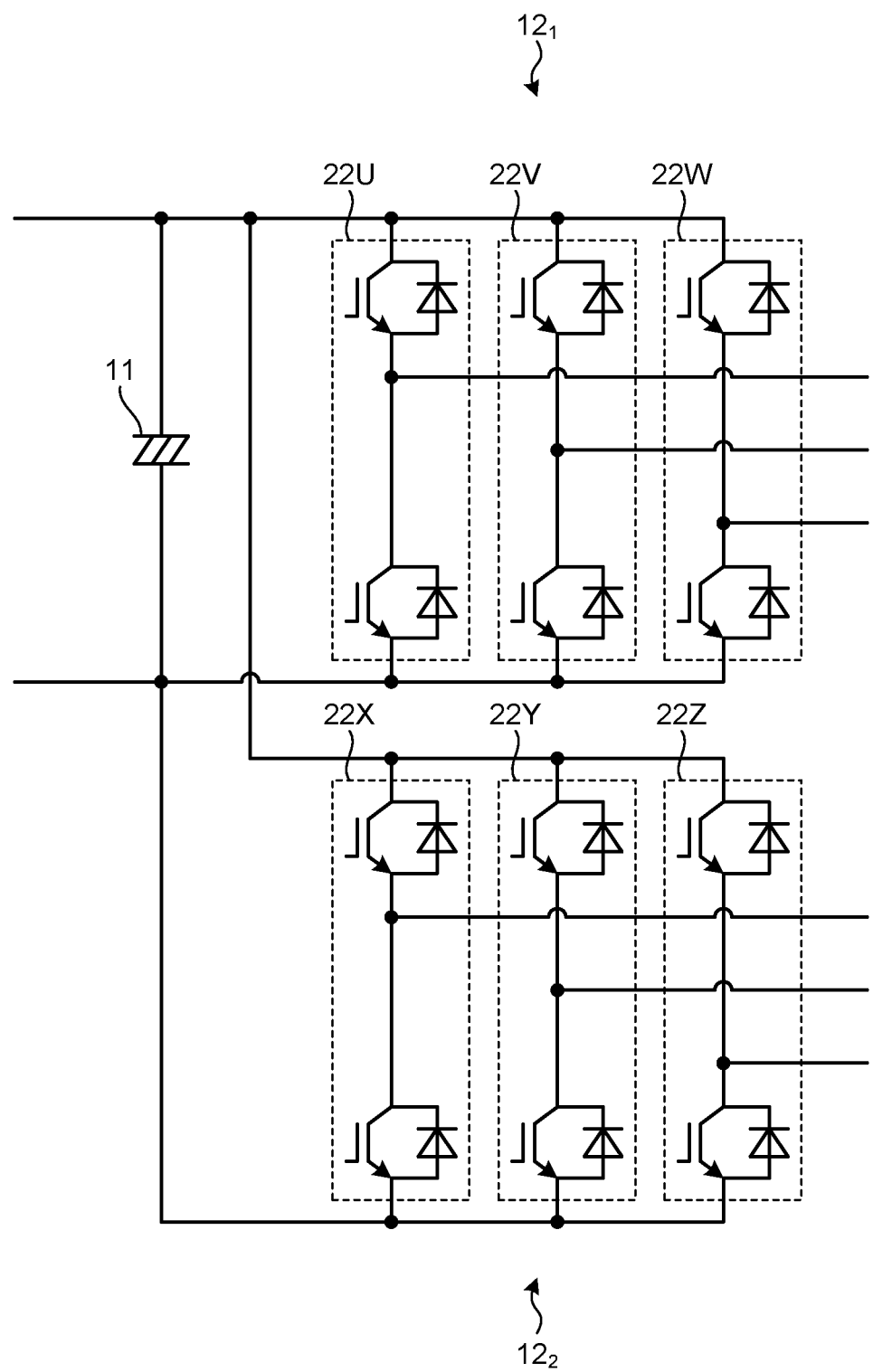
FIG. 9 is a diagram illustrating an example configuration of an inverter main circuit according to the first embodiment.

FIG. 9 is a diagram illustrating an example configuration of an inverter main circuit according to the first embodiment. The inverter main circuit according to the first embodiment includes the first inverter $12_1$ and the second inverter $12_2$. The first inverter $12_1$ and the second inverter $12_2$ are connected, on the input side thereof, to both ends of the capacitor 11 in parallel.

The first inverter $12_1$ includes a phase-U leg 22U, a phase-V leg 22V, and a phase-W leg 22W that correspond to three phases, and each leg has the semiconductor device of the upper arm and the semiconductor device of the lower arm that are connected in series with each other. The phase-U leg 22U, the phase-V leg 22V, and the phase-W leg 22W are connected in parallel with one another to form a three-phase bridge circuit.

The second inverter $12_2$ includes a phase-X leg 22X, a phase-Y leg 22Y, and a phase-Z leg 22Z that correspond to three phases, and each leg has the semiconductor device of the upper arm and the semiconductor device of the lower arm that are connected in series with each other. The phase-X leg 22X, the phase-Y leg 22Y, and the phase-Z leg 22Z are connected in parallel with one another to form a three-phase bridge circuit.

As long as the total capacitance of the three-phase motors is unchanged, the number of the semiconductor devices to be used may also be the same. Twelve semiconductor devices are used in both the conventional example and the first embodiment. While the conventional example illustrated in FIG. 4 is characterized in that each arm has a parallel configuration, the first embodiment illustrated in FIG. 9 is characterized in that the inverters are connected in parallel.

Figure 10:
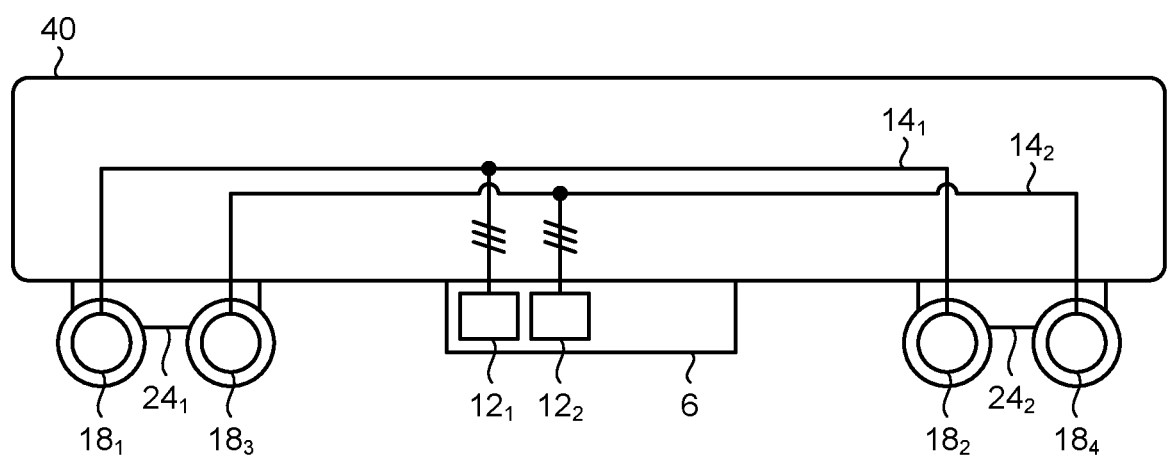
FIG. 10 is a diagram illustrating an example arrangement of the induction motors in the first embodiment.

FIG. 10 is a diagram illustrating an example arrangement of the induction motors in the first embodiment. In FIG. 10, like reference characters designate elements corresponding to elements illustrated in FIG. 1.

In FIG. 10, the first inverter $12_1$ and the second inverter $12_2$ are disposed under the floor in a central portion of the vehicle 40, and are housed in the enclosure 6. In addition, the two induction motors $18_1$ and $18_2$ belonging to the first motor group $16_1$ are mounted on a first bogie $24_1$ and a second bogie $24_2$, respectively. Similarly, the two induction motors $18_3$ and $18_4$ belonging to the second motor group $16_2$ are also mounted on the first bogie $24_1$ and the second bogie $24_2$, respectively. That is, one induction motor $18_1$ belonging to the first motor group $16_1$ and one induction motor $18_3$ belonging to the second motor group $16_2$ are mounted on the first bogie $24_1$, and the other induction motor $18_2$ belonging to the first motor group $16_1$ and the other induction motor $18_4$ belonging to the second motor group $16_2$ are mounted on the second bogie $24_2$.

According to the above arrangement, the first conductor $14_1$ is installed between first bogie $24_1$ and the second bogie $24_2$ via the first inverter $12_1$ disposed in a central portion of the vehicle 40. The second conductor $14_2$ is also installed between the first bogie $24_1$ and the second bogie $24_2$ via the second inverter $12_2$ disposed in a central portion of the vehicle 40. When the first conductor $14_1$ and the second conductor $14_2$ are installed, the first conductor $14_1$ and the second conductor $14_2$ are arranged close to each other. Note that a description will be made later as to how small the inter-distance between the first conductor $14_1$ and the second conductor $14_2$ should be when the first conductor $14_1$ and the second conductor $14_2$ are arranged.

Figure 11:
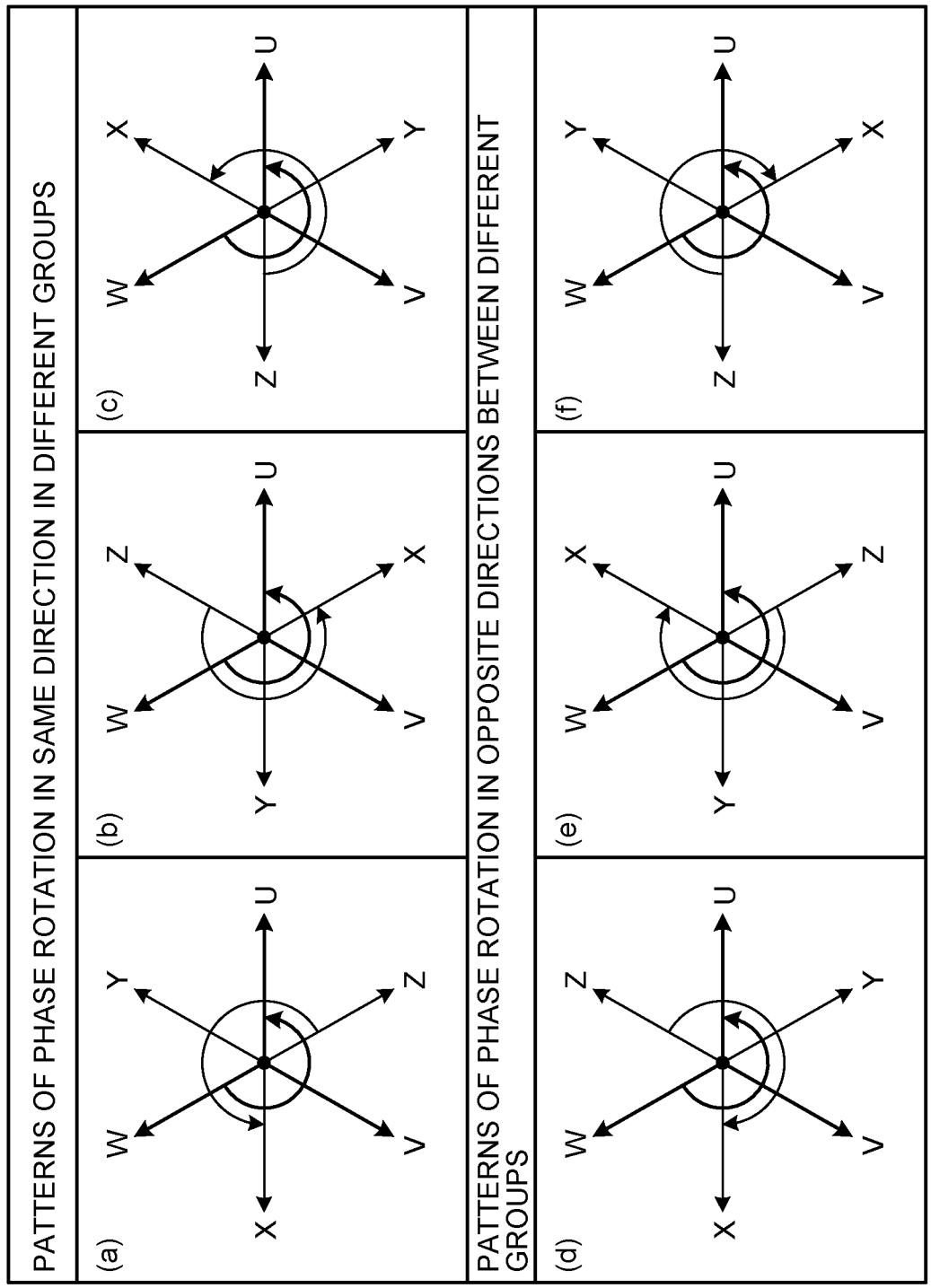
FIG. 11 is a set of diagrams for use in describing variations of the voltage command provided to the leg of each phase of each group in the first embodiment.

FIG. 11 is a set of diagrams for use in describing variations of the voltage command provided to the leg of each phase of each group in the first embodiment. Parts (a) to (c) of the top portion of FIG. 11 illustrate patterns of the different groups of phases rotating in the same direction. Parts (d) to (f) of the bottom portion of FIG. 11 illustrate patterns of the different groups of phases rotating in the opposite directions.

In FIG. 11, the symbol "U" represents the voltage command of phase U, which is a first phase of the first inverter $12_1$. Similarly, the symbol "V" represents the voltage command of phase V, which is a second phase of the first inverter $12_1$, and the symbol "W" represents the voltage command of phase W, which is a third phase of the first inverter $12_1$.

The voltage command for each phase is a vector, whose rotational direction is defined as the counterclockwise direction with respect to phase U. In addition, the vectors of phases U,V,W rotate in the order of U,V,W. Accordingly, the vector of phase V lags 120 degrees behind that of phase U in the rotational direction, and the vector of phase W lags 120 degrees behind that of phase V (i.e., 240 degrees behind that of phase U) in the rotational direction.

In addition, the symbol "X" represents the voltage command of phase X, which is a first phase of the second inverter $12_2$. Similarly, the symbol "Y" represents the voltage command of phase Y, which is a second phase of the second inverter $12_2$, and the symbol "Z" represents the voltage command of phase Z, which is a third phase of the second inverter $12_2$.

The voltage command for each phase is a vector, whose rotational direction is defined as the counterclockwise direction with respect to phase X. In addition, the vectors of phases X,Y,Z rotate in the order of X,Y,Z. Accordingly, the vector of phase Y lags 120 degrees behind that of phase X in the rotational direction, and the vector of phase Z lags 120 degrees behind that of phase Y (i.e., 240 degrees behind that of phase X) in the rotational direction.

FIG. 11(a) illustrates an example in which the vectors of phase-U and phase-X are in opposite directions, that is, the vector of phase-X is 180 degrees out of phase with that of phase-U. FIG. 11(b) illustrates an example in which the vectors of phase-U and phase-Y are in opposite directions, that is, the vector of phase-Y is 180 degrees out of phase with that of phase-U. FIG. 11(c) illustrates an example in which the vectors of phase-U and phase-Z are in opposite directions, that is, the vector of phase-Z is 180 degrees out of phase with that of phase-U.

The group of phases U, V, and W and the group of phases X, Y, and Z rotating in the opposite direction to that of phases U,V,W provide three patterns, as in parts (a) to (c) above. These patters are illustrated in the bottom portion in the order of parts (d), (e), and (f) from the left.

Any one of the above patterns of parts (a) to (f) shows that the three phase pairs, each of which is a combination of one phase of phases U, V, and W and a corresponding one phase of phases X, Y, and Z, each have an opposite phase relationship.

Figure 12:
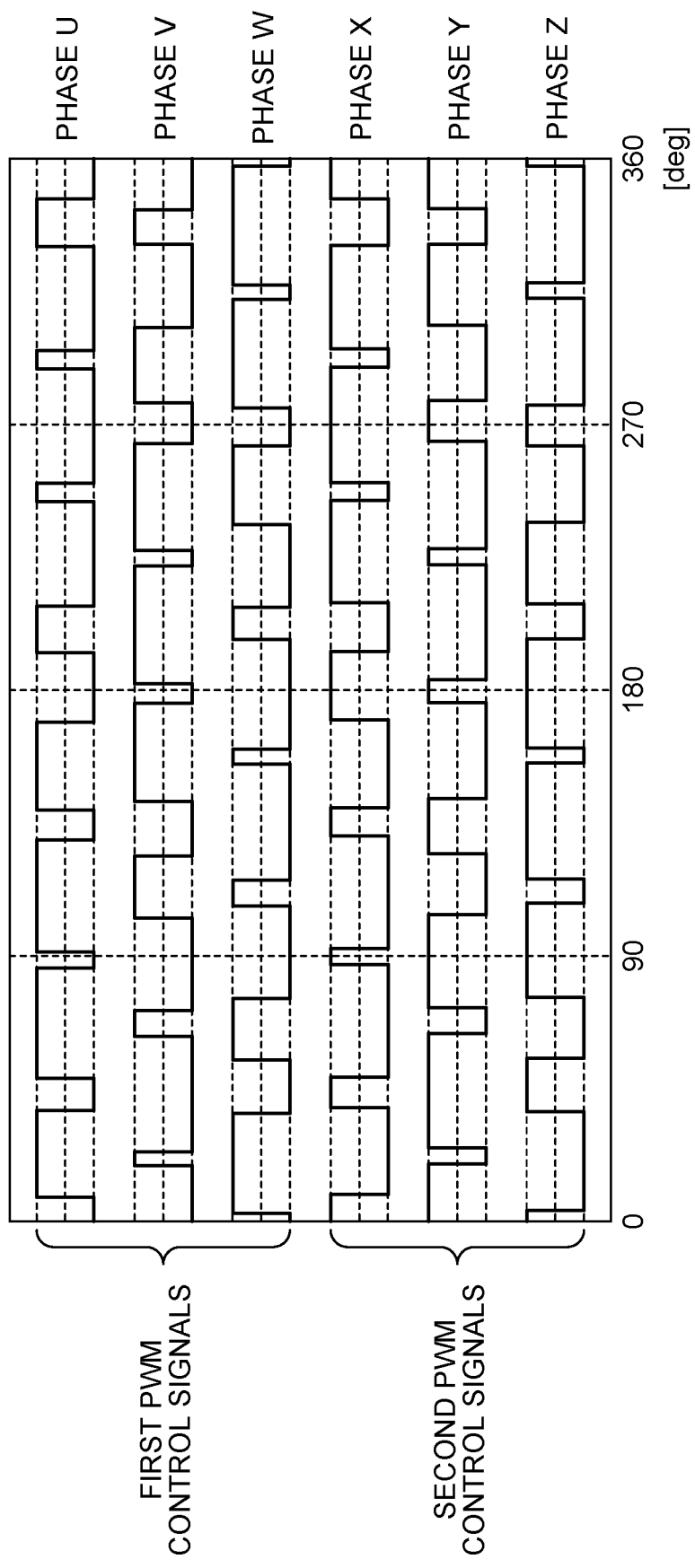
FIG. 12 is a diagram illustrating PWM control signals generated by the individual phase voltage commands illustrated in FIG. 11(a).
Figure 13:
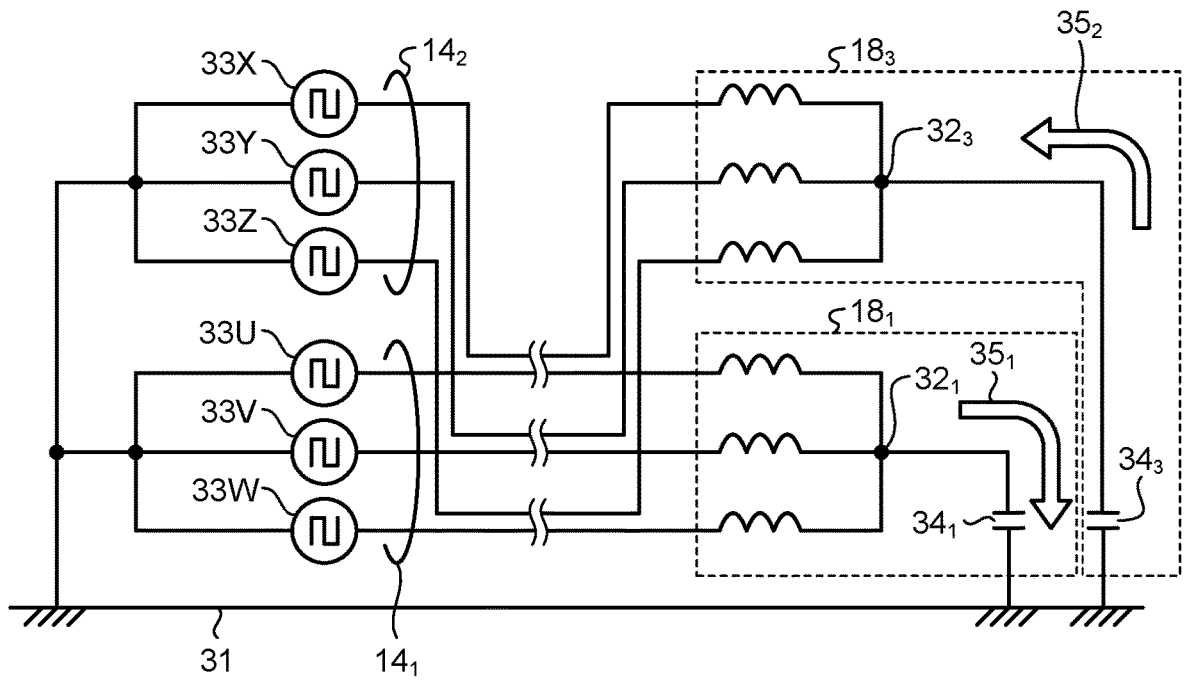
FIG. 13 is a diagram of an equivalent circuit of the circuit of FIG. 1, for use in describing a leakage current in the first embodiment.

FIG. 12 is a diagram illustrating PWM control signals generated by the individual phase voltage commands illustrated in FIG. 11(a). FIG. 13 is a diagram of an equivalent circuit of the circuit of FIG. 1, for use in describing a leakage current in the first embodiment.

In FIG. 12, the first PWM control signals are PWM control signals provided to the first inverter $12_1$ that controls the first motor group $16_1$. The second PWM control signals are PWM control signals provided to the second inverter $12_2$ that controls the second motor group $16_2$.

An equivalent circuit of the circuit of FIG. 1 is illustrated in FIG. 13. A phase-U voltage 33U, a phase-V voltage 33V, and a phase-W voltage 33W are applied to the induction motor $18_1$ belonging to the first motor group $16_1$. As a neutral point potential $32_1$ of the induction motor $18_1$ varies, a leakage current $35_1$ flows between the point at the neutral point potential $32_1$ and the line at the reference potential 31 through a stray capacitor $34_1$.

In addition, a phase-X voltage 33X, a phase-Y voltage 33Y, and a phase-Z voltage 33Z are applied to the induction motor $18_3$ belonging to the second motor group $16_2$. As a neutral point potential $32_3$ of the induction motor $18_3$ varies, a leakage current $35_2$ flows between the point at the neutral point potential $32_3$ and the line at the reference potential 31 through a stray capacitor $34_3$.

In FIG. 12, one of the waveform of the PWM control signal for phase U and the waveform of the PWM control signal for phase X is a vertically inverted waveform of the other waveform. The same is true of the relationship between the PWM control signal for phase V and the PWM control signal for phase Y, and between the PWM control signal for phase W and the PWM control signal for phase Z. That is, the individual phases in the first PWM control signals correspond one-to-one to the individual phases in the second PWM control signals, and a pair of the PWM control signals has signal waveforms in opposite phases to each other.

Thus, the common mode voltage generated at the neutral point potential $32_1$ of the induction motor $18_1$ and the common mode voltage generated at the neutral point potential $32_3$ of the induction motor $18_3$ provide vertically inverted pulse waveforms. As a result, the leakage current $35_1$ flowing through the stray capacitor $34_1$ and the leakage current $35_2$ flowing through the stray capacitor $34_3$ are in opposite phases to each other. In addition, the leakage current $35_1$ flowing through the first conductor $14_1$ and the leakage current $35_2$ flowing through the second conductor $14_2$ are in opposite phases to each other. More specifically, leakage currents flow in opposite directions in each of pairs of phase U and phase X, of phase V and phase Y, and of phase W and phase Z. Magnetic fields generated by leakage currents are thus canceled out in the section where the electrical wirings for the corresponding phases of each group are installed close to each other. This results in reduction in a voltage induced in a wayside device on the ground.

Note that FIG. 13 illustrates the pair of closely arranged conductors for phase U and phase X, the pair of closely arranged conductors for phase V and phase Y, and the pair of closely arranged conductors for phase W and phase Z. The arrangement of the conductors as illustrated in FIG. 13 is advantageous in cancelling out the magnetic fields generated by the leakage currents. A method of installing a pair of conductors close to each other may be to twist together a pair of conductors of corresponding phases and install the twisted conductors. Note that all the six conductors may be twisted together if the production is feasible.

Figure 14:
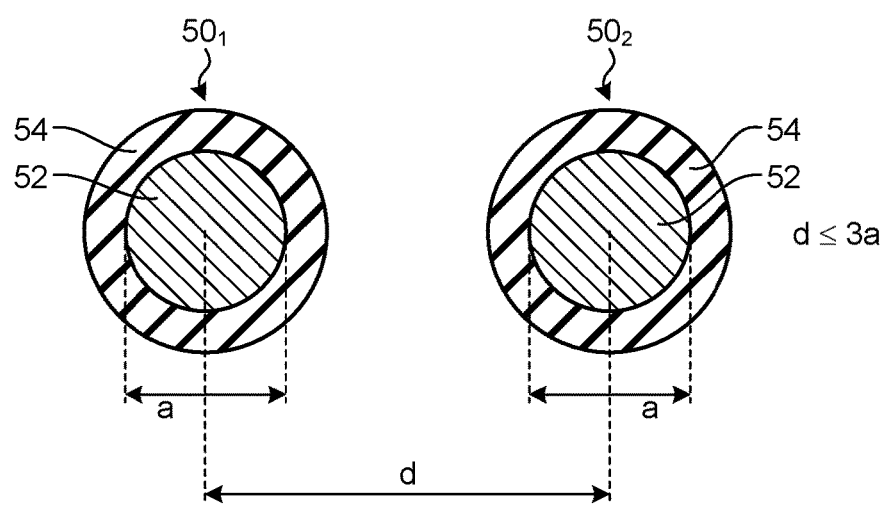
FIG. 14 is a diagram for use in describing an inter-conductor distance in the first embodiment.

FIG. 14 is diagram for use in describing an inter-conductor distance in the first embodiment. FIG. 14 illustrates the cross-sectional shapes of two conductors $50_1$ and $50_2$. In FIG. 14, the conductor $50_1$ is, for example, the conductor for phase U, and the conductor $50_2$ is, for example, the conductor for phase X.

Each of the conductors $50_1$ and $50_2$ includes a conductor portion 52 and a sheath 54 that is an electrical insulator covering the outer surface of the conductor portion 52. The conductors $50_1$ and $50_2$ each have a circular cross section. The inter-conductor distance between the conductor $50_1$ and the conductor $50_2$ is herein defined as the distance between the cross-sectional center of the conductor $50_1$ and the cross-sectional center of the conductor $50_2$. This distance is referred to as inter-center distance, which is denoted by "d". As to how small the foregoing inter-conductor distance should be, the first embodiment is based on the assumption that the relationship of Expression (1) below is satisfied, where a diameter "a" of the conductor portion 52 is the reference length.

$$d \leq 3a \tag{1}$$

That is, in the first embodiment, the inter-center distance between the conductor $50_1$ and the conductor $50_2$ is equal to or less than three times the diameter "a" of the conductor portion 52.

Note that although the conductors $50_1$ and $50_2$ illustrated in FIG. 14 each have a circular cross section, the shape thereof is not limited thereto. That is, each cross section may be non-circular. A non-circular shape may be a shape other than a circle, such as a polygon such as a triangle or a quadrangle, an elliptic shape, or a shape defined by multiple curves.

In addition, although the conductor portions 52 of the conductors $50_1$ and $50_2$ illustrated in FIG. 14 have the same diameter "a", the conductor portions 52 may have different diameters. Note that when the cross-sectional shapes of the conductors $50_1$ and $50_2$ are not circular, and differ from each other, Expression (1) above is modified as follows.

First, the inter-center distance between the conductor $50_1$ and the conductor $50_2$ is referred to as "first length", which is denoted by "b". Then, the maximum length of the conductor portion in the cross section of the conductor $50_1$ is referred to as "second length", which is denoted by "$c_1$". In addition, the maximum length of the conductor portion in the cross section of the conductor $50_2$ is referred to as "third length", which is denoted by "$c_2$". With "b", "$c_1$", and "$c_2$", Expression (1) above can be modified as shown by Expression (2) below.

$$b \leq (c_1/2 + c_2/2) \times 3 \tag{2}$$

That is, in the first embodiment, the first length, i.e., the inter-center distance between the conductor $50_1$ and the conductor $50_2$, is equal to or less than three times the average value of the second length and the third length, where the second length is the maximum length of the conductor portion in the cross section of the conductor $50_1$, and the third length is the maximum length of the conductor portion in the cross section of the conductor $50_2$.

Next, a description will be made as to some considerations to take in providing the electric vehicle control device according to the first embodiment.

Figure 15:
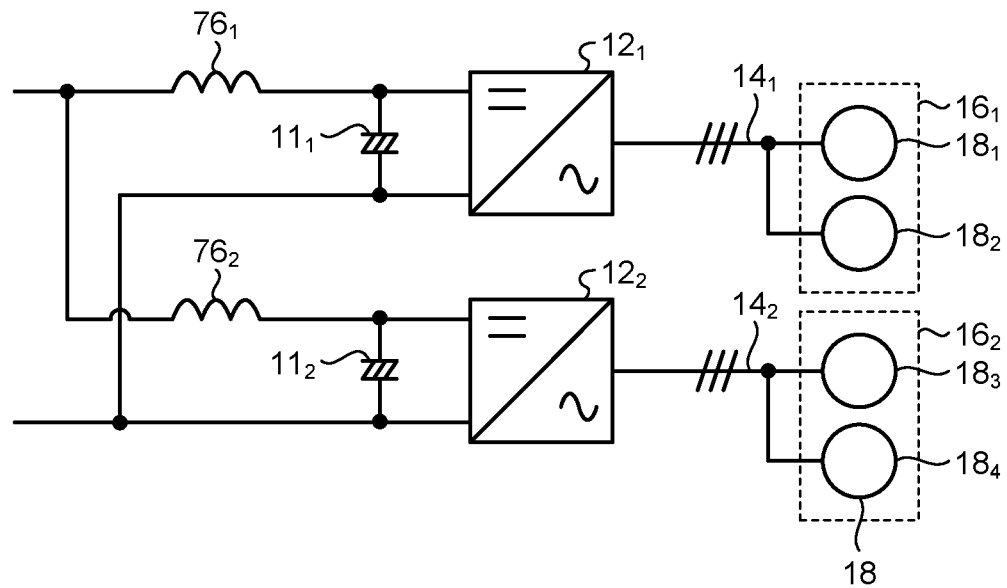
FIG. 15 is a diagram illustrating a circuit configuration of an electric vehicle control device according to a comparative example for the circuit configuration of FIG. 1.

FIG. 15 is a diagram illustrating a circuit configuration of an electric vehicle control device according to a comparative example for the circuit configuration of FIG. 1. In FIG. 15, like reference characters designate elements corresponding to elements illustrated in FIG. 1.

In FIG. 15, a capacitor $11_1$ and a filter reactor $76_1$ are connected to a DC-side portion of the first inverter $12_1$. The capacitor $11_1$ and the filter reactor $76_1$ jointly form a first filter circuit. Similarly, a capacitor $11_2$ and a filter reactor $76_2$ are connected to a DC-side portion of the second inverter $12_2$. The capacitor $11_2$ and the filter reactor $76_2$ jointly form a second filter circuit. That is, FIG. 15 illustrates a configuration in which the first inverter $12_1$ and the second inverter $12_2$ have filter circuits, separately.

As described above, in the electric vehicle control device of the first embodiment, the first inverter $12_1$ and the second inverter $12_2$ perform switching operation in opposite phases to each other. As a result, current ripples generated in DC-side portions of the individual inverters are in opposite phases. For the separate filter circuits, thus, the capacitor voltages of the respective inverters will differ between the first motor group $16_1$ and the second motor group $16_2$. This will break symmetry of the leakage currents generated in the groups.

In contrast, the configuration of FIG. 1 uses a common capacitor, and a DC-side portion of the first inverter $12_1$ and a DC-side portion of the second inverter $12_2$ are connected to the common capacitor in parallel. This configuration allows the common capacitor to remove current ripples that are in opposite phases to each other and generated into DC-side portions of the individual inverters. This maintains symmetry of the leakage currents generated in the individual groups.

Figure 16:
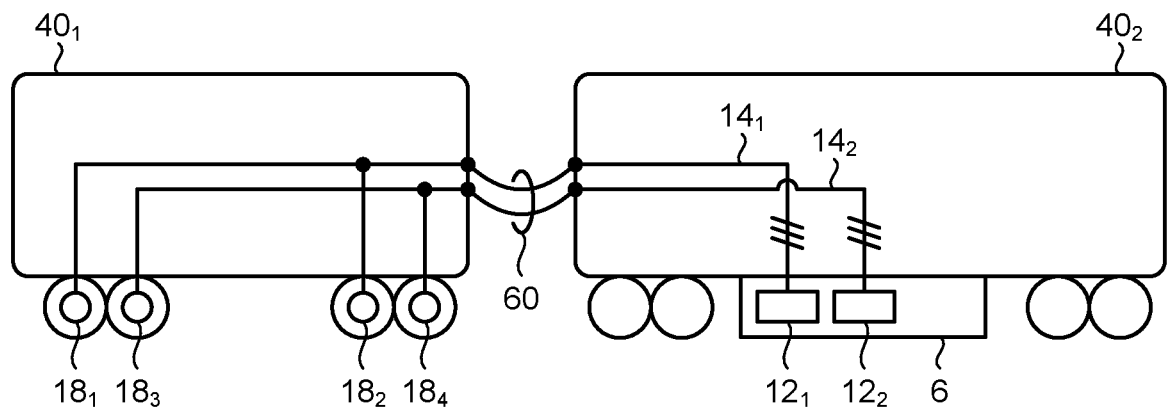
FIG. 16 is a diagram illustrating an example arrangement of the induction motors, different from the arrangement of in FIG. 10, in the first embodiment.

FIG. 16 is a diagram illustrating an example arrangement of the induction motors, different from the arrangement of FIG. 10, in the first embodiment. In FIG. 16, like reference characters designate elements corresponding to elements illustrated in FIG. 10.

For a reason of underfloor space, or in view of weight balance of each vehicle, inverters and motors may be mounted on different vehicles in railroad vehicles. In this case, as illustrated in FIG. 16, the induction motors $18_1$ to $18_4$ are mounted on a vehicle $40_1$, and the first inverter $12_1$ and the second inverter $12_2$ are mounted on a vehicle $40_2$. Bridge wiring 60, which is an inter-vehicle electrical wiring, is provided between the vehicle $40_1$ and the vehicle $40_2$.

The structure of the bridge wiring needs to be flexibly deformable in view of the vehicle travelling in a curved section and the vehicle vibration. Accordingly, the bridge wiring is installed with some downward slack. The bridge wiring would be thus more likely to have undesirable effects on a wayside device as a distance between the bridge wiring and a wayside device is shorter than between wiring of the other portions and the wayside device. This problem can be addressed employing the foregoing technique of the first embodiment that enables the leakage currents in the individual groups to be in opposite phases in the bridge wiring 60 as well. This can cancel out the magnetic fields in the bridge wiring 60 as well, thereby reducing a voltage induced in a wayside device.

Figure 17:
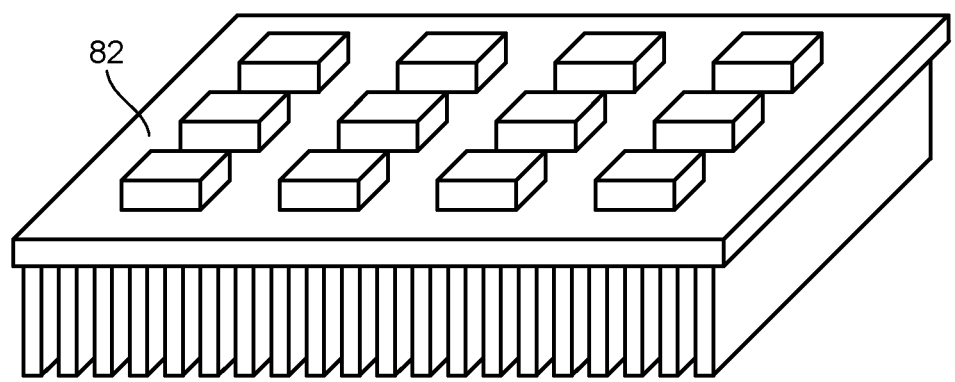
FIG. 17 is a diagram illustrating an example configuration of a cooling device in the first embodiment.

FIG. 17 is a diagram illustrating an example configuration of a cooling device in the first embodiment. FIG. 17 illustrates an example in which the six semiconductor devices included in the first inverter $12_1$ and the six semiconductor devices included in the second inverter $12_2$, i.e., the twelve semiconductor devices in total, are mounted on a fin base 82 of a cooling device 80.

When the foregoing technique of the first embodiment is used, it is more desirable that the electrical wirings of the individual groups be installed in parallel in a longer section. In addition, as described above, the first inverter $12_1$ and the second inverter $12_2$ are preferably connected to a common capacitor. This facilitates the first inverter $12_1$ and the second inverter $12_2$ sharing the cooling device with a reduced distance between the first inverter $12_1$ and the second inverter $12_2$. This enables downsizing the inverter unit including the first inverter $12_1$ and the second inverter $12_2$.

For the electric vehicle control device according to the first embodiment, as describe above, a first inverter and induction motors belonging to a first motor group are connected to each other by a first conductor, and a second inverter and induction motors belonging to a second motor group are connected to each other by a second conductor. Between each of the first and second inverters and the bogies having the induction motors mounted thereon, a first length is equal to or less than three times the average value of a second length and a third length, the first length being the inter-center distance between the first and second conductors, the second length being the maximum length of a conductor portion of the first conductor in the cross section of the first conductor, the third length being the maximum length of a conductor portion of the second conductor in the cross section of the second conductor. This configuration cancels out magnetic fields generated by leakage currents, thereby reducing a voltage induced in a wayside device on the ground. This can also reduce or eliminate leakage noise without relying on additional installation of filter elements.

Note that, in the foregoing configuration, the first inverter and the second inverter may be housed in the same enclosure. This enables downsizing the device. In addition, a variation in impedance between the leakage current paths can be reduced. Moreover, the length of the section where the wiring of each group is installed alone can be reduced.

Also in the foregoing configuration, a single capacitor for smoothing the DC voltage is provided, and a DC-side portion of the first inverter and a DC-side portion of the second inverter are both connected to the single capacitor in parallel. This improves symmetry of output voltages in the first motor group and the second motor group, thereby improving the effect of canceling magnetic fields generated by leakage currents.

Also in the foregoing configuration, the first and second conductors may be twisted together, and installed, between the first or second inverter and the bogies. Installation of the first and second conductors twisted together can reduce the distance between the first conductor and the second conductor, thereby improving the effect of canceling magnetic fields.

Note that when one of the first inverter $12_1$ and the second inverter $12_2$ stops operating, the other inverter preferably stops operating, too. Such control can prevent generation of excess leakage noise.

Second Embodiment

Figure 18:
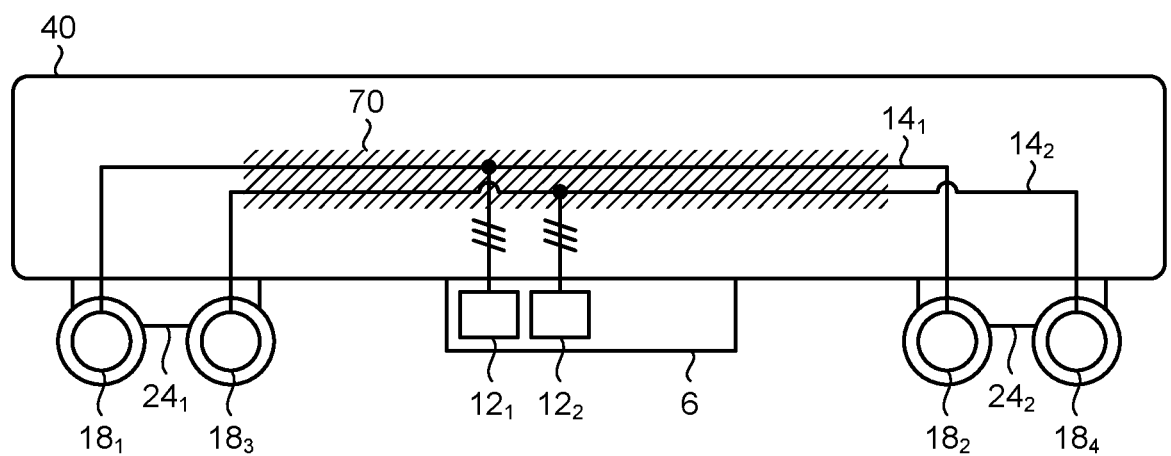
FIG. 18 is a diagram illustrating an in-vehicle configuration of an electric vehicle control device according to a second embodiment.

FIG. 18 is a diagram illustrating an in-vehicle configuration of an electric vehicle control device according to a second embodiment. In FIG. 18, like reference characters designate elements corresponding to elements illustrated in FIG. 10.

If the pulse-shaped voltage applied from each inverter to corresponding motors is an ideal pulse-shaped voltage that has a zero rise time or a zero fall time, the common mode voltages in the respective groups will be completely symmetric with respect to each other. Moreover, if the impedances of the respective leakage current paths are the same, the magnetic fields will be completely canceled out. In fact, however, the rise time and the fall time of a voltage waveform are not the same, because of a delay time of a gate drive circuit or a variation in characteristic among semiconductor devices. The impedances of the leakage current paths are not the same, either.

In view of this, in the second embodiment, the first conductor $14_1$ and the second conductor $14_2$, which are wirings of the individual groups, are surrounded by the same duct 70 as illustrated in FIG. 18. In the second embodiment, the duct 70 is used as a shielding member.

Surrounding the wirings of the individual groups with the same duct 70 can shield magnetic fields that remain without being canceled out. In addition, capability of shielding a very low level of magnetic field component affecting the surrounding environment can reduce the effect on a wayside device. Note that surrounding the wirings with the same duct also provides an effect of preventing a variation in impedance between the leakage current paths of the individual groups. Note also that, needless to say, the number of components is smaller than when a duct is individually installed for the wiring of each group.

Figure 19:
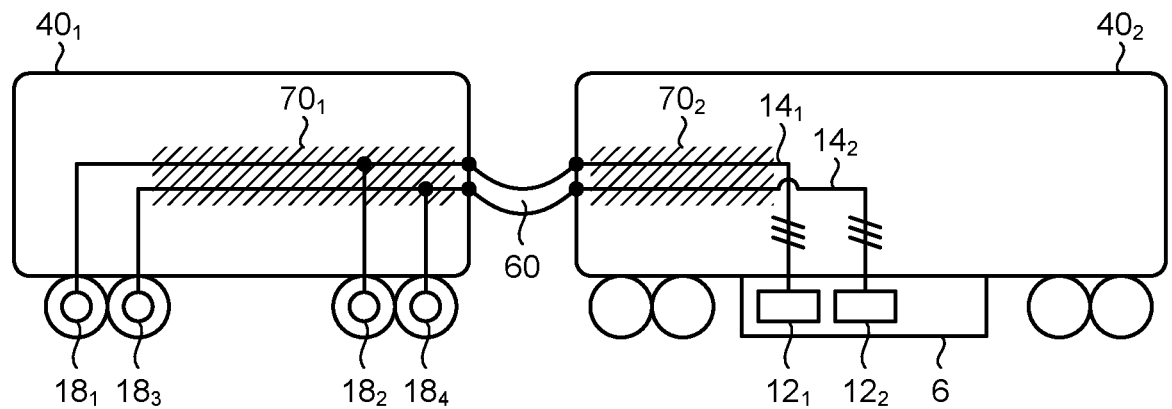
FIG. 19 is a diagram illustrating an in-vehicle configuration of an electric vehicle control device according to a variation of the second embodiment.

Meanwhile, FIG. 19 is a diagram illustrating an in-vehicle configuration of an electric vehicle control device according to a variation of the second embodiment. In FIG. 19, like reference characters designate elements corresponding to elements illustrated in FIG. 16.

Since no duct can be installed in the section of the bridge wiring, ducts are installed in other sections where the wirings run in parallel than the section of the bridge wiring. FIG. 19 illustrates an example in which a duct $70_1$ is installed in the vehicle $40_1$, and a duct $70_2$ is installed in the vehicle $40_2$ other than the section of the bridge wiring 60. Note that, from a viewpoint of reducing a variation in leakage impedance, the wirings of the individual groups are desirably contained in the duct in sections of the same length. In other words, a smaller difference between the wiring lengths of the portions of the wirings of the individual groups contained in the duct is more desirable.

As described above, in the electric vehicle control device according to the second embodiment, the first and second conductors are surrounded with the same shielding member between the first or the second inverter and the bogies. This configuration allows the shielding member to shield the magnetic fields that has not been canceled out, thereby reducing the effect on a wayside device. In addition, a variation in impedance between the leakage current paths of the individual groups can be reduced.

Third Embodiment

Figure 20:
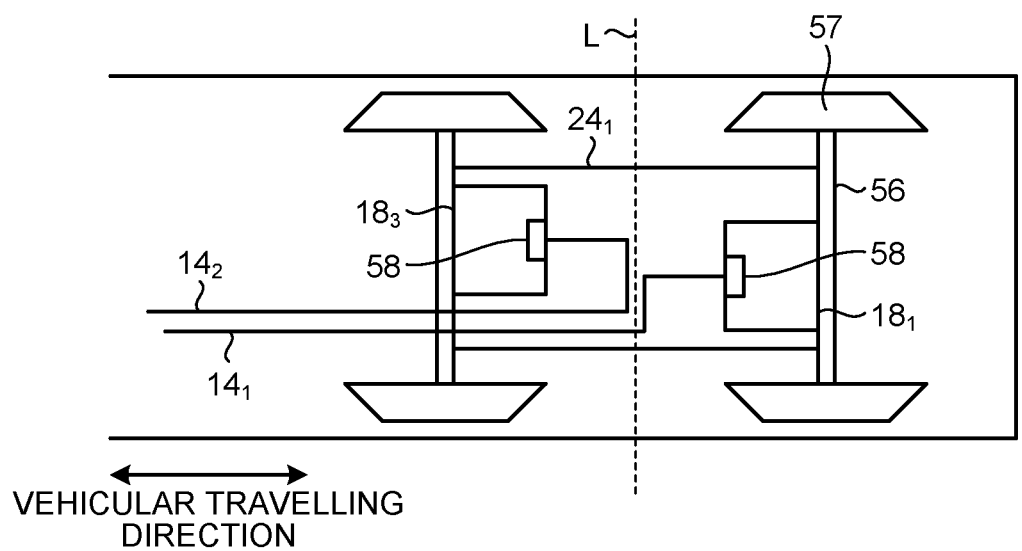
FIG. 20 is a diagram illustrating a configuration of and around a bogie of an electric vehicle control device according to a third embodiment.

FIG. 20 is a diagram illustrating a configuration of and around a bogie of an electric vehicle control device according to a third embodiment. In FIG. 20, like reference characters designate elements corresponding to elements illustrated in FIG. 10.

FIG. 20 is a diagram of the first bogie $24_1$ illustrated in FIG. 10 viewed from the rails. FIG. 20 illustrates wheels 57, axles 56 each interconnecting a pair of the wheels 57, the first bogie $24_1$ supported by the axles 56, and the two induction motors $18_1$ and $18_3$ mounted on the first bogie $24_1$. The two induction motors $18_1$ and $18_3$ are each illustrated with a motor connection unit 58 that is an electrical connection unit for electrical connection to the first conductor $14_1$ or the second conductor $14_2$. The following description may designate the motor connection unit 58 on each of the induction motors belonging to the first motor group $16_1$ as "first motor connection unit", and the motor connection unit 58 on each of the induction motors belonging to the second motor group $16_2$ as "second motor connection unit".

Near the motor connection units 58 of the two induction motors $18_1$ and $18_3$, there is a section where the first conductor $14_1$ and the second conductor $14_2$ cannot be installed in parallel. In the third embodiment, the length of the section where the wirings of the individual groups are not parallel is minimized as much as possible. Specifically, the wirings of the individual groups are routed along a middle position L, between the motor connection unit 58 of the induction motor $18_1$ and the motor connection unit 58 of the induction motor $18_3$ in the vehicular travelling direction, and are then separated from each other at the middle position L such that each of the thus separated wirings is connected to the corresponding one of the motor connection units 58. This configuration provides an increased length of the section where the first conductor $14_1$ and the second conductor $14_2$ run in parallel, thereby reducing the residual magnetic field components that have not been canceled out. This results in reduction in the effect of leakage current on a wayside device near the motor connection unit 58 as well.

Fourth Embodiment

Figure 21:
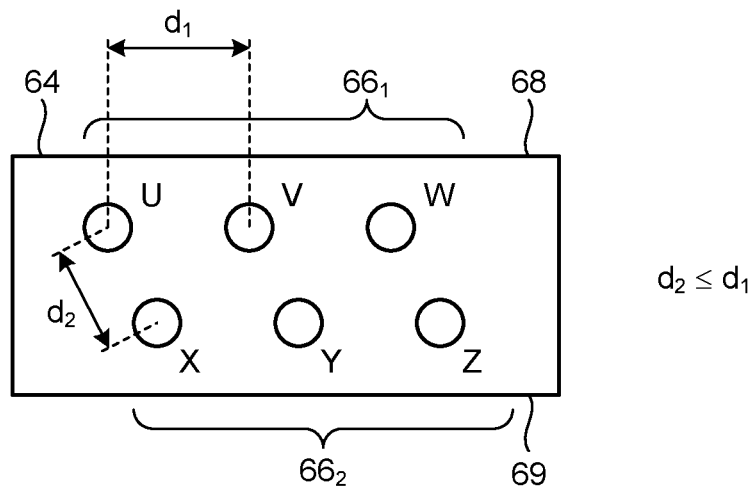
FIG. 21 is a diagram illustrating a configuration of an inverter connection unit of an electric vehicle control device according to a fourth embodiment.

FIG. 21 is a diagram illustrating a configuration of an inverter connection unit of an electric vehicle control device according to a fourth embodiment. An inverter connection unit 64 includes a first terminal portion $66_1$ for connecting the first conductor $14_1$ to the first inverter $12_1$, and a second terminal portion $66_2$ for connecting the second conductor $14_2$ to the second inverter $12_2$. The first terminal portion $66_1$ includes three terminals U, V, and W, and the second terminal portion $66_2$ includes three terminals X, Y, and Z. Note that the inverter connection unit 64 may be formed on any surface of the enclosure 6 housing the first inverter $12_1$ and the second inverter $12_2$.

In FIG. 21, the inverter connection unit 64 has a transversely long, rectangular shape. The terminals U, V, and W in the first terminal portion $66_1$ are equidistantly arranged along the longitudinal direction near a first side 68 of the two long sides of the inverter connection unit 64. In addition, the terminals X, Y, and Z in the second terminal portion $66_2$ are equidistantly arranged along the longitudinal direction near a second side 69 of the two long sides of the inverter connection unit 64. Note that although FIG. 21 illustrates the terminal X as being positioned at a longitudinally offset position with respect to the terminal U, the terminal X and the terminal U may be longitudinally aligned with each other. This relationship is also applicable to the terminal Y and the terminal V, and to the terminal Z and the terminal W.

Meanwhile, as illustrated in FIG. 21, assume that the center distance between the terminal U and the terminal V is denoted by $d_1$. Although not illustrated, the center distance between the terminal V and the terminal W is $d_1$, and the center distance between the terminal U and the terminal W is $2d_1$. Similarly, although not illustrated, the center distance between the terminal X and the terminal Y is $d_1$, the center distance between the terminal Y and the terminal Z is $d_1$, and the center distance between the terminal X and the terminal Z is $2d_1$. The distance $d_1$ is therefore the minimum distance between phase terminals of the first terminal portion $66_1$, and is also the minimum distance between phase terminals of the second terminal portion $66_2$.

In addition, as illustrated in FIG. 21, assume that the center distance between the terminal U and the terminal X is denote by $d_2$. Although not illustrated, the center distance between the terminal V and the terminal Y, and the center distance between the terminal W and the terminal Z are also $d_2$. Note that the center distance between the terminal U and the terminal Y, and the center distance between the terminal U and the terminal Z are longer than $d_2$. The center distance between the terminal X and the terminal V, and the center distance between the terminal X and the terminal W are also longer than $d_2$. The distance $d_2$ is therefore the minimum distance between the first terminal portion $66_1$ and the second terminal portion $66_2$.

These distances $d_1$ and $d_2$ satisfy the relationship of Expression (3) below.

$$d_2 \leq d_1 \quad (3)$$

Radiation noise generated in the enclosure 6 is shielded and prevented from leaking out. Meanwhile, a magnetic field generated by leakage current may have an effect on a wayside device at near the inverter connection unit 64 to which the conductors are connected. Thus, in the fourth embodiment, the terminals are arranged, as expressed by Expression (3) above, such that the inter-center distance between the terminals of phases providing the PWM control signals in opposite phases is equal to or less than the inter-center distance between the terminals of phases of the same group. In other words, the terminals are arranged such that the minimum distance between the first terminal portion $66_1$ and the second terminal portion $66_2$ is equal to or less than the minimum distance between phase terminals in the first terminal portion $66_1$ or the minimum distance between phase terminals in the second terminal portion $66_2$. Such a configuration can reduce radiation noise emitted from or from near the enclosure 6 housing the first inverter $12_1$ and the second inverter $12_2$.

Figure 22:
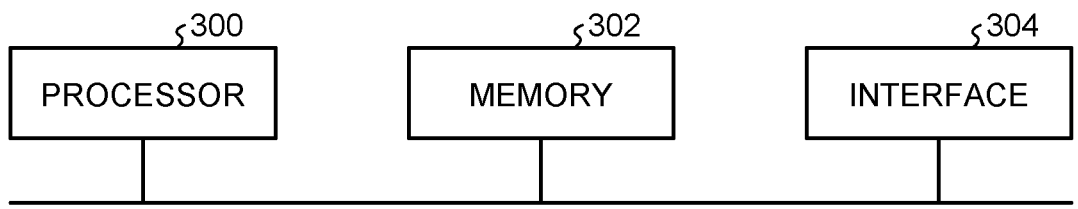
FIG. 22 is a block diagram illustrating an example of hardware configuration that implements the functionality of the control unit in the first embodiment through the fourth embodiment.
Figure 23:
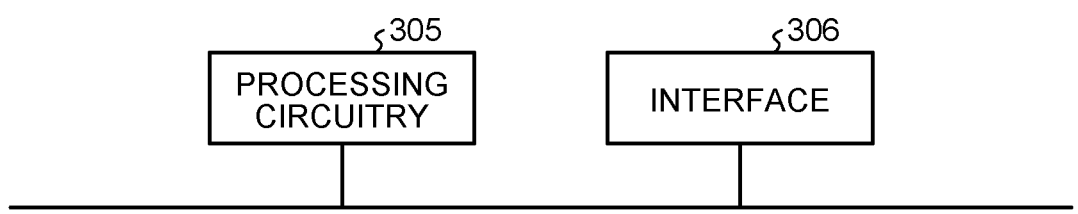
FIG. 23 is a block diagram illustrating another example of hardware configuration that implements the functionality of the control unit in the first embodiment through the fourth embodiment.

The functionality of the control unit 20 in the first embodiment through the fourth embodiment described above can be implemented in a hardware configuration illustrated in FIG. 22 or 23. FIG. 22 is a block diagram illustrating an example of hardware configuration that implements the functionality of the control unit in the first embodiment through the fourth embodiment. FIG. 23 is a block diagram illustrating another example of hardware configuration that implements the functionality of the control unit in the first embodiment through the fourth embodiment.

The functionality of the control unit 20 in the first embodiment can be implemented, as illustrated in FIG. 22, in a configuration including a processor 300, which performs computation, a memory 302, which stores a program to be read by the processor 300, and an interface 304, which inputs and outputs a signal.

The processor 300 may be computing means such as a computing unit, a microprocessor, a microcomputer, a central processing unit (CPU), or a digital signal processor (DSP). In addition, the memory 302 may be a non-volatile or volatile semiconductor memory such as a random access memory (RAM), a read-only memory (ROM), a flash memory, an erasable programmable ROM (EPROM), or an electrically EPROM (EEPROM) (registered trademark); a magnetic disk, a flexible disk, an optical disk, a compact disc, a MiniDisc, or a digital versatile disc (DVD).

The memory 302 stores a program for implementing the functionality of the control unit 20 in the first embodiment through the fourth embodiment. The processor 300 provides and receives necessary information via the interface 304, and executes a program stored in the memory 302, and can thus perform processing described above. The result of computation by the processor 300 can be stored in the memory 302.

Alternatively, the functionality of the control unit 20 in the first embodiment through the fourth embodiment can also be implemented by using processing circuitry 305 illustrated in FIG. 23.

In FIG. 23, the processing circuitry 305 may be a single circuit, a set of multiple circuits, an application specific integrated circuit (ASIC), a field-programmable gate array (FPGA), or a combination thereof. The processing circuitry 305 can obtain information input to the processing circuitry 305 and information output from the processing circuitry 305 via an interface 306.

Note that the configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 1 overhead line; 2 current collector unit; 3, 57 wheel; 4 rail; 5 reactor; 6 enclosure; 10 electric vehicle control device; 11, $11_1$, $11_2$ capacitor; 12 inverter; $12_1$ first inverter; $12_2$ second inverter; $14_1$ first conductor; $14_2$ second conductor; $16_1$ first motor group; $16_2$ second motor group; 18, $18_1$, $18_2$, $18_3$, $18_4$ induction motor; 20 control unit; 22U phase-U leg; 22V phase-V leg; 22W phase-W leg; 22X phase-X leg; 22Y phase-Y leg; 22Z phase-Z leg; 24 bogie; $24_1$ first bogie; $24_2$ second bogie; 26U phase-U voltage command; 26V phase-V voltage command; 26W phase-W voltage command; 28 carrier; 31 reference potential; 32, $32_1$, $32_3$ neutral point potential; 33U phase-U voltage; 33V phase-V voltage; 33W phase-W voltage; 33X phase-X voltage; 33Y phase-Y voltage; 33Z phase-Z voltage; 34, $34_1$, $34_3$ stray capacitor; 35, $35_1$, $35_2$ leakage current; 40, $40_1$, $40_2$ vehicle; $50_1$, $50_2$ conductor; 52 conductor portion; 54 sheath; 56 axle; 58 motor connection unit; 60 bridge wiring; 64 inverter connection unit; $66_1$ first terminal portion; $66_2$ second terminal portion; 68 first side; 69 second side; 70, $70_1$, $70_2$ duct; $76_1$, $76_2$ filter reactor; 80 cooling device; 82 fin base; UNI, VNI, WNI, UPI, VPI, WPI semiconductor device.

The invention claimed is:

1. An electric vehicle control device to control a plurality of induction motors with a single inverter, the electric vehicle control device comprising:

a first inverter to control a first electric motor group defined by a plurality of induction motors; and
a second inverter to control a second electric motor group defined by a plurality of induction motors, wherein
the induction motors belonging to the first electric motor group are mounted on different bogies,
the induction motors belonging to the second electric motor group are mounted on different bogies,
the first inverter and the induction motors belonging to the first electric motor group are connected to each other by a first conductor,
the second inverter and the induction motors belonging to the second electric motor group are connected to each other by a second conductor, and
between each of the first and second inverters and the bogies, a first length is equal to or less than three times an average value of a second length and a third length, the first length being an inter-center distance between the first conductor and the second conductor, the second length being a maximum length of a conductor portion of the first conductor in a cross section of the first conductor, the third length being a maximum length of a conductor portion of the second conductor in a cross section of the second conductor.

2. The electric vehicle control device according to claim 1, comprising:

a controller to output first pulse width modulation control signals to the first inverter, and to output second pulse width modulation control signals to the second inverter, wherein
individual phases in the first pulse width modulation control signals correspond in one-to-one to individual phases in the second pulse width modulation control signals, and a pair of the first and second pulse width modulation control signals have signal waveforms in opposite phases to each other.

3. The electric vehicle control device according to claim 1, wherein
the first and second conductors are surrounded with the same shielding member between the first or second inverter and the bogies.

4. The electric vehicle control device according to claim 1, wherein
the first and second conductors are twisted together, and installed, between the first or second inverter and the bogies.

5. The electric vehicle control device according to claim 1, wherein
the induction motors belonging to the first electric motor group each include a first motor connection unit to be connected to the first conductor,
the induction motors belonging to the second electric motor group each include a second motor connection unit to be connected to the second conductor, and
the first conductor and the second conductor are installed such that the first conductor and the second conductor are routed along a middle position between the first motor connection unit and the second motor connection unit.

6. The electric vehicle control device according to claim 1, wherein
the first and second inverters are housed in the same enclosure.

7. The electric vehicle control device according to claim 6, wherein
the enclosure comprises a first terminal portion to be connected to the first conductor, and a second terminal portion to be connected to the second conductor, and a minimum distance between the first terminal portion and the second terminal portion is equal to or less than a minimum distance between phase terminals in the first terminal portion or a distance between phase terminals in the second terminal portion.

8. The electric vehicle control device according to claim 6, wherein the enclosure comprises a single capacitor to smooth a direct current voltage, and a direct current-side portion of the first inverter and a direct current-side portion of the second inverter are both connected to the capacitor in parallel.

9. The electric vehicle control device according to claim 6, wherein a plurality of semiconductor devices included in the first inverter and a plurality of semiconductor devices included in the second inverter comprises are mounted on the same cooling device for cooling the semiconductor devices included in the first and second inverters.

10. The electric vehicle control device according to claim 1, wherein when one of the first and second inverters stops operating, the other inverter stops operating.

\* \* \* \* \*